United States Patent
Ingley, III et al.

(10) Patent No.: US 7,497,187 B2
(45) Date of Patent: Mar. 3, 2009

(54) RODENT CAGE TO ACCOMMODATE MONITORING DEVICES

(75) Inventors: Herbert A. Ingley, III, Gainesville, FL (US); David W. Hahn, Gainesville, FL (US); August H. Battles, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 302 days.

(21) Appl. No.: 11/119,839

(22) Filed: May 2, 2005

(65) Prior Publication Data

US 2005/0241591 A1    Nov. 3, 2005

Related U.S. Application Data

(60) Provisional application No. 60/567,039, filed on Apr. 30, 2004.

(51) Int. Cl.
  *A01K 1/03* (2006.01)
(52) U.S. Cl. ..................................................... 119/417
(58) Field of Classification Search ................. 119/417, 119/418, 421, 452
  See application file for complete search history.

(56) References Cited

U.S. PATENT DOCUMENTS

| | | | | |
|---|---|---|---|---|
| 4,528,941 A | * | 7/1985 | Spengler | 119/418 |
| 4,574,734 A | * | 3/1986 | Mandalaywala et al. | 119/421 |
| 5,474,024 A | * | 12/1995 | Hallock | 119/417 |
| 6,234,111 B1 | * | 5/2001 | Ulman et al. | 119/54 |
| 6,748,898 B2 | * | 6/2004 | Ulman et al. | 119/57.92 |
| 6,758,163 B1 | * | 7/2004 | Sternitzky | 119/51.11 |
| 6,837,184 B2 | * | 1/2005 | Gondhalekar et al. | 119/421 |
| 6,899,542 B2 | * | 5/2005 | Kurokawa | 119/421 |
| 6,944,990 B2 | * | 9/2005 | Noyes | 49/169 |
| 6,998,980 B2 | * | 2/2006 | Ingley et al. | 119/421 |
| 7,131,398 B2 | * | 11/2006 | Cohen et al. | 119/455 |
| 7,142,167 B2 | * | 11/2006 | Rochelle et al. | 343/867 |

* cited by examiner

*Primary Examiner*—Thomas Price
(74) *Attorney, Agent, or Firm*—Akerman Senterfitt; Gregory A. Nelson; Gregory M. Lefkowitz (57) ABSTRACT

An animal containment device that includes a top wall, a bottom wall, a front wall, a rear wall, and at least one side wall. In one aspect, the device may also include an opening in the rear wall for insertion of a monitoring module for monitoring the animals within the device. In another aspect, the animal containment device may include walls made from a translucent material having a photosensitive material for controlling the amount of light within the animal containment device. In still another aspect, the animal containment device may include one or more sensors in the device and a monitoring linkage and display for displaying the data from the sensors.

9 Claims, 6 Drawing Sheets

RODENT CAGE TO ACCOMMODATE MONITORING DEVICES

CROSS-REFERENCE TO RELATED APPLICATIONS

This application claims priority to U.S. Provisional Patent Application No. 60/567,039, which was filed Apr. 30, 2004.

STATEMENT REGARDING FEDERALLY SPONSORED RESEARCH OR DEVELOPMENT

Not applicable.

FIELD OF THE INVENTION

The present invention is directed to an article of manufacture useful in an animal containment device that may be used as a static unit or in connection with a ventilated cage and rack system.

BACKGROUND OF THE INVENTION

Developments over the last twenty to thirty years in science and industry have promoted the keeping of animals in racks of cages. These animals are primarily small mammals such as rabbits, rats, hamsters, guinea pigs, and mice.

Due to the distinctive demands of laboratory work, cages have been further specialized so that they provide for the animal's comfort, are easily cleaned and sterilized, and/or may be uniformly positioned on storage racks to provide the maximum number of cages in the available space while maintaining adequate ventilation and spacing necessary to prevent the spread of disease.

In the prior art, it was believed that the most common way to prevent the spread of disease through contact of the animals while insuring adequate ventilation was to design the cage with an open or a solid top, three solid side walls, and an open grated front wall. The bottom was an open grid that permitted waste material to pass onto the collection tray below. Nevertheless, it has been discovered that these types of cages do not prevent the spread of disease as airborne pathogens could easily pass from one cage to another in the rack, thereby permitting the quick transmission of pathogens from animals in adjacent cages. These open-topped cages did offer certain advantages. For example, open topped hanging cages that slide into brackets mounted on the underside of shelves on the racks have the advantage that they do not require doors since the underside of the shelf serves as a solid barrier (or top) for the animal cage and access to the cage is easily provided by sliding the cage out from the rack to expose the open top. This permits the food and water containers to be directly mounted on the front, open grated panel for maximum utilization of area at a minimum cost.

Another drawback to these cages is that, due to economic considerations, they are constructed out of a single sheet of metal to which a grid is attached at the front and on the bottom. Not only do the cages not come apart for storage, but they may only be used for one variety of animal, for example a rat, and not another animal of a different size, for example a mouse. The mouse could escape through or be injured by the larger grid used for containing a rat, and the waste material of the larger animal, the rat, would not go through the smaller grid used for a mouse.

Other prior art cages include a cage bottom having four walls and a base with an open top. A wire bar lid that stretches across the top of the cage bottom and extends into the cage bottom, is disposed between the cage bottom and bonnet. A bonnet supporting an air filter thereon is placed on top of the cage bottom wire bar lid thereby covering the cage bottom. The wire bar lid is constructed from stainless steel and supports food and water in the cage while also preventing the rodents, particularly rats, from gnawing through the bonnet and damaging the filter or escaping from the cage.

Several problems exist with the use of the wire bar lid in the prior art cage design. First, because the wire bar lid extends into the cage bottom, it creates an artificial ceiling between the cage bottom and the bonnet thereby reducing the amount of area and height available for the rodents. Also the wire bar lid must be removed to provide access to the animal requiring labor and work space for placing the lid during use. Also, the wire bar lid prevents the bonnet from sitting flush on the cage bottom thereby allowing air to either escape or enter the cage bottom over the lid wires creating a Venturi effect in a ventilated cage environment. Although this problem is most pronounced when rounded wire bar lids are used, it nevertheless exists even when flat rimmed wire bar lids are employed.

In addition, some prior art cages have a drawback in that materials that are used to construct the cages are not capable of withstanding chemical and/or steam sterilization. Such cages are often sterilized in autoclaves at 120°-130° C. causing the cage to denigrate over time. This results in the drawback that with the passing of time the cage becomes opaque, prohibiting visualization of animals within the cage, or the cages become cracked and crazed preventing an adequate level of sanitation.

Accordingly, what is needed is a novel animal containment device that eliminates one or more of the disadvantages of prior art animal containment devices. In particular, the animal containment device may be used in ventilated racks, may be durable and able to withstand the rigors of sterilization, and/or may be designed to be easily monitored.

SUMMARY OF THE INVENTION

The invention provides an animal containment device including a top wall, a bottom wall, a front wall, at least one side wall, and a rear wall; wherein the top wall, bottom wall, front wall, rear wall, and at least one side wall are composed of a translucent material and wherein the top wall, bottom wall, front wall, rear wall, and at least one side wall include a photosensitive material.

In yet another aspect, the present invention provides an animal control device including a top wall, a bottom wall, a front wall, at least one side wall, a rear wall, at least one sensor, and a monitoring linkage for displaying data from the at least one sensor to a display.

BRIEF DESCRIPTION OF THE DRAWINGS

Other objects, features and advantages of the invention will become apparent upon reading the following detailed description, while referring to the attached drawings, in which.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides an animal containment device that may be used alone as a static unit or in connection with a ventilated cage and rack system. In particular, the present invention includes one or more inventive aspects, as compared to prior art animal containment devices. In one embodiment, the device may be constructed and arranged to permit the device to be easily monitored through the use of a monitoring module that is located in a rear wall of the device, unlike prior art monitoring modules that are located in the front or on top of the device. As such, the monitoring module may be integrated with any ventilation system and provides for easier monitoring of the animals, as well as a simpler system for transferring data from one cage to another as animals are moved from one cage to another.

In another aspect, the present invention provides a monitoring linkage, such as a fiber optic connection, that is integrated with the device and is used with a display system for displaying data. This aspect may be used with any sensor located on a rear wall of the device, including any sensors that may be associated with the monitoring module.

In yet another aspect, the present invention provides an animal containment device that may include a photosensitive polymer for monitoring and/or controlling the amount of light that enters the cages, which may be especially beneficial in those embodiments wherein the animal in the cage is sensitive to light.

In general, the present invention provides an animal containment device that may be used to contain one or more animals. The devices of the present invention may be constructed of a material that is able to contain one or more animals. In beneficial embodiments, the material is capable of withstanding sterilization conditions. The sterilization conditions are those used to sterilize the device after each use and may be selected from steam and/or chemical sterilization methods. In steam sterilization methods, the device is subjected to steam having a temperature of from about 110 to about 200° C. In chemical sterilization methods, the cage is subjected to sterilization by contacting the cage with a chemical sterilizing agent that may include, but is not limited to, chlorine.

In addition, the device of the present invention may be constructed from a material that is capable of withstanding the rigors associated with handling and use of the device. For example, in one embodiment, the device is constructed and arranged from a material that the animals cannot chew through or escape from. Additionally, in some embodiments, the device is constructed and arranged from a material that may withstand the day-to-day handling that typically occurs with animal cages, such as through bedding changes and/or movement of the cage to add and/or remove animals from the cage.

Additionally, in other beneficial embodiments of the present invention, the device is constructed from a material that is translucent. As such, the device would permit viewing of the animals therein and the amount of light entering the device could be controlled. Accordingly, the device of the present invention may be constructed of a material that satisfies one or more of the following characteristics: is capable of withstanding sterilization conditions, is capable of withstanding day-to-day handling, and/or is translucent. Accordingly, materials that may be used in the present invention include, but are not limited to, polycarbonate, a plastic material, a glass material, and a combination thereof. In select embodiments, the device of the present invention is constructed of polycarbonate.

In those embodiments wherein a translucent material is used to construct the animal containment device, it may be beneficial, depending on the animals being contained and/or the experiments to be performed, to control the amount of light within the device. Accordingly, in one embodiment of the present invention, the device is constructed from a material that includes a photosensitive material. As used herein, a "photosensitive material" is a material that is capable of automatically controlling the amount of light within the device as the ambient light changes.

In one embodiment, the photosensitive material may include a coating applied to the material of which the device is constructed. A photosensitive material, which may also be referred to as a "photochromatic material," includes one or more substances, such as silver chloride, silver halide or a polyamide, which is embedded within the walls of the device. The substances are selected such that they are transparent to visible light in the absence of UV light, which is the normal makeup of artificial lighting. But when exposed to UV rays in sunlight or from indoor lights emitting UV light, the molecules containing the substance undergo a chemical process that causes them to change shape. The new molecular structure absorbs portions of the visible light, causing the walls to darken. The number of the molecules that change shape varies with the intensity of the UV rays.

When the source of UV light is removed, the reverse chemical reaction takes place. The sudden absence of UV radiation causes the molecules to revert to their original shape, resulting in the loss of their light absorbing properties. In either direction, the entire process occurs very rapidly.

The photosensitive substances used in the present invention may be, in one embodiment, distributed evenly throughout each wall of the cage. In an alternative embodiment, each wall is constructed by immersion in a chemical bath, such that the photochromic molecules are absorbed to a depth of from about 10 to about 150 microns into the surface of the wall. In yet another alternative embodiment, a coating of the photochromic material may be applied, with the coating being from about 1 to about 15 microns thick.

In another aspect of the present invention, the device of the present invention is designed in a manner to permit the device to be capable of containing one or more animals. It may be beneficial to monitor these animals to ensure that the conditions are correct and that there are no conditions that may adversely affect the health of the animals.

Accordingly, in another aspect of the present invention, the cages may also be designed to permit monitoring of the device and the animals contained in the device. As such, the device of the present invention may include an opening in the rear of the cage into which a monitoring module is placed. In other select embodiments, the monitoring device may be a monitoring module as set forth in U.S. patent application Ser. No. 10/427,312, the disclosure of which is hereby incorporated by reference. In this application, the module is attached to a top or front of the cage. Nevertheless, in the present invention, the monitoring module is located in the rear of the device, thereby enabling it to be integrated with any air inlet and exhaust associated with the cage, unlike prior art cages. By placing the module in the rear of the cage and/or integrating it with the ventilation system of a rack, the cages are easier to track and move since the module forms part of the cage.

In addition, the use of a monitoring module that is inserted into the rear of the cage also permits animals to be moved to different cages, but wherein the data associated with these animals is also easily moved. In these embodiments, which may be seen in greater detail in FIGS. 2 and 4, the monitoring module may be installed in a framework of the device, such as through the use of guides that the module slides into, that enables the module to substantially block off the opening in the cage for the monitoring module and operate as one of the walls to the containment device. In addition, the monitoring module may be selected such that it may be transferred from cage to cage, thereby permitting data about the animals in one cage to be transferred to another cage at the same time the animals are transferred.

Figure 5A:
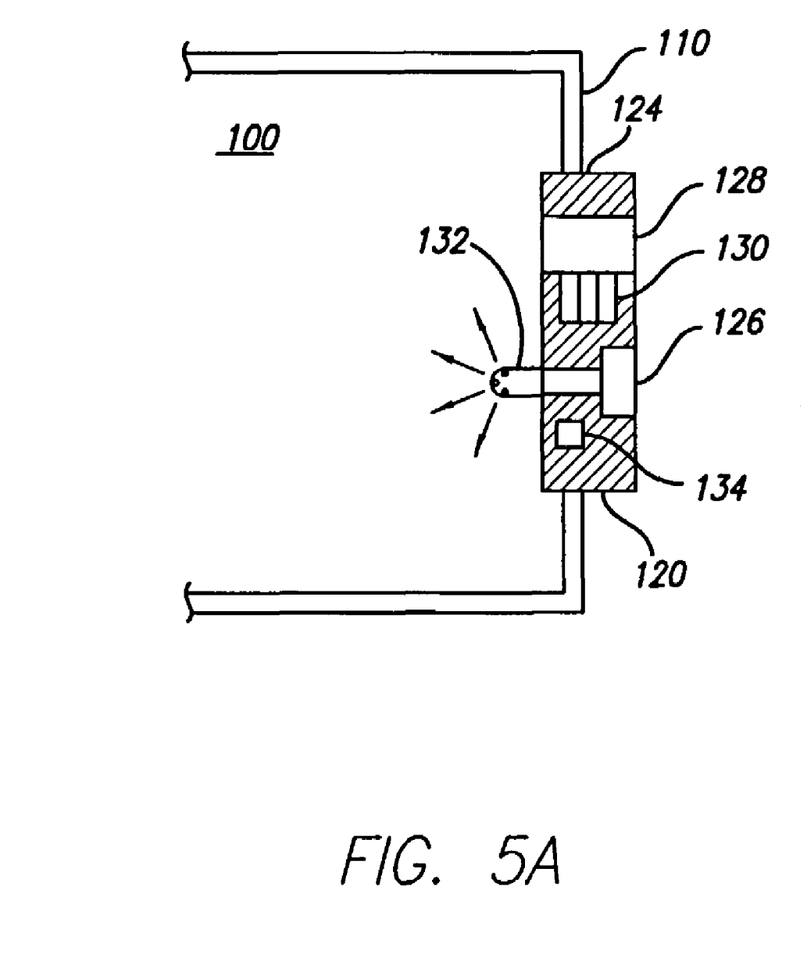
FIGS. 5a and 5b are cross-sectional views of a ventilation system according to one aspect of the present invention.
Figure 5B:
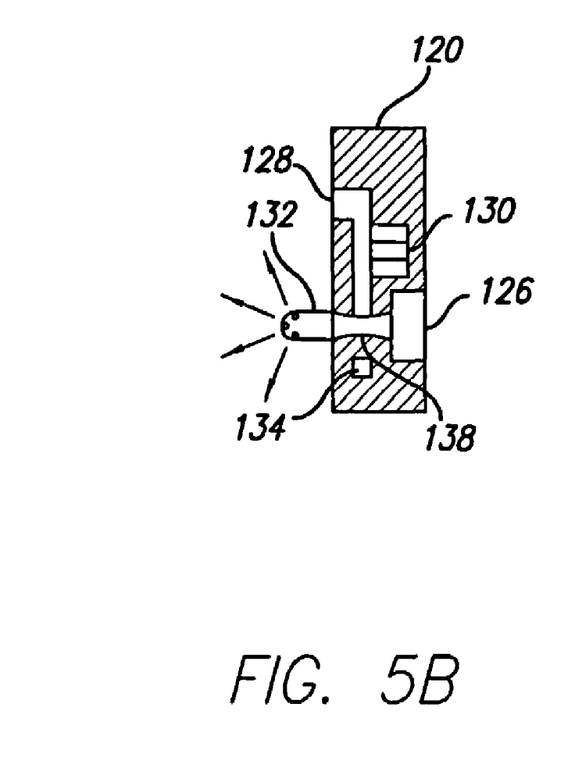

In alternative embodiments, which are shown in greater detail in FIGS. 5a and 5b, the device is capable of being used with a forced air ventilation system. A forced air ventilation system is capable of transferring air into the device and then from the device to provide a substantially continuous supply of fresh air for the animals. In this embodiment, an air diffuser or the like may be used such that air entering the device is slowed substantially to prevent the air from being too cold or too forceful on the animal, but while still supplying an adequate supply of fresh air to the animal and for removing stale air from the device. The monitoring module may be integrated with the forced air ventilation system, which is also located in the rear of the cage.

The monitoring module includes one or more sensors in a readily contained package that may be transferred from cage to cage. These sensors may be used to measure various conditions within the cage including, but not limited to, temperature, humidity, oxygen concentration, nitrogen concentration, carbon dioxide concentration, or a combination thereof. Nevertheless, the cages of the present invention, in an alternative embodiment, may simply include the sensors in conjunction with the ventilation air supply and/or exhaust systems, and such that the sensors are not contained within the module. As with the monitoring module, these sensors may be used in conjunction with a monitoring system to alert a caregiver if one or more measurements are above or below a selected level, thereby permitting the caregiver to quickly check on the status if the animal. This may be beneficial in those situations wherein a single caregiver is taking care of hundreds or even thousands of animals.

Figure 6:
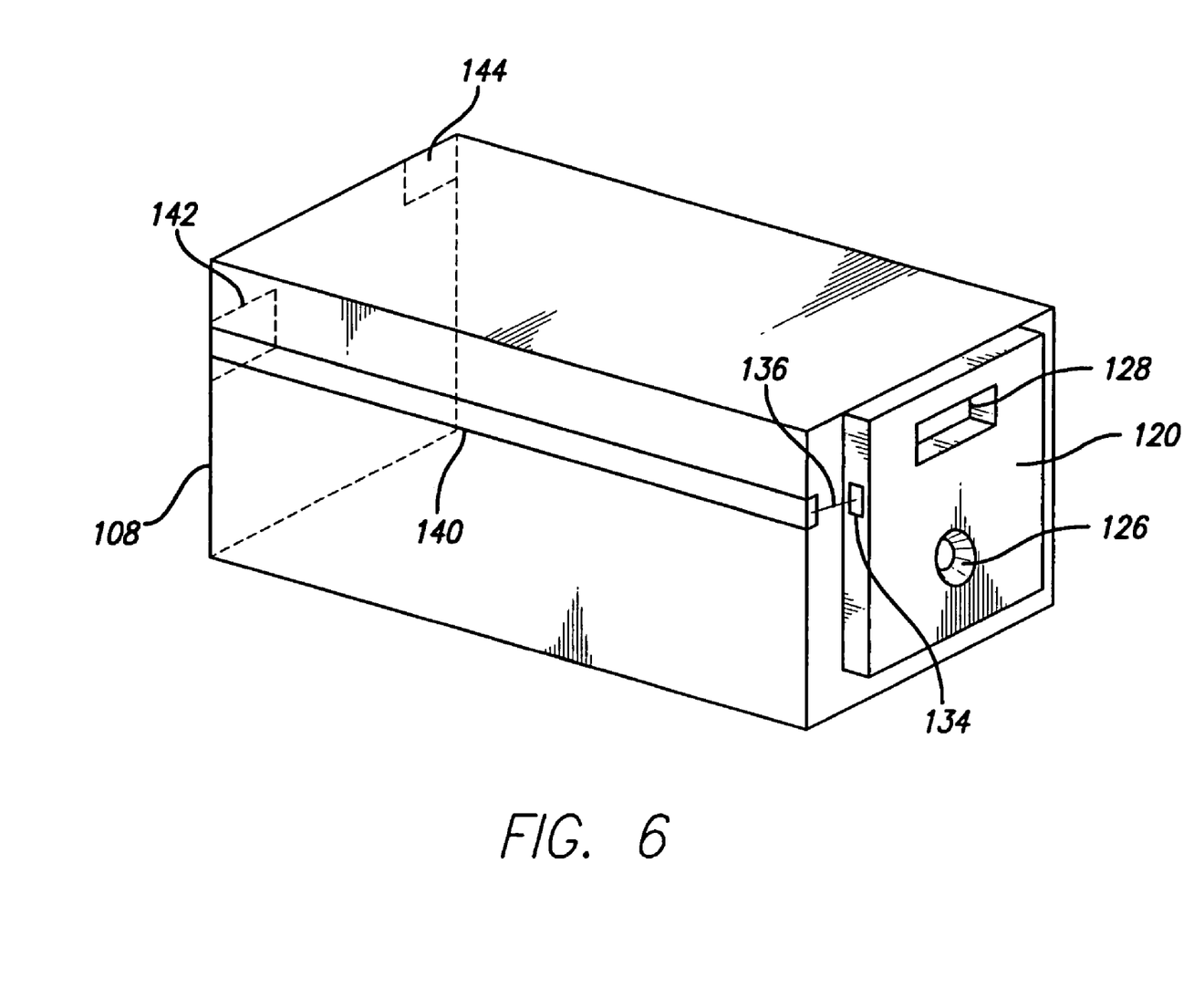
FIG. 6 is a perspective view of one embodiment of an animal control device in accordance with other aspects of the present invention.

In yet another alternative embodiment, which is shown in greater detail in FIG. 6, the devices of the present invention may include a monitoring linkage for permitting easy monitoring of each cage through the use of a suitable connection, such as a fiber optic connection, linking a monitoring system in the rear of the cage with a display located at the front of the cage. As such, the monitoring linkage may permit a user to view the front of the cage and check data from sensors mounted at the rear of the cage, such as through the monitoring module or through sensors located in the air supply and/or exhaust systems. In an alternative embodiment, a wireless fidelity (WiFi) system may be used as the monitoring linkage. The display on the front of the cage may be a liquid crystal display (LCD), a light emitting diode (LED) display, an infrared (IR) display, or any other display capable of displaying sensor data.

The inventive aspects of the present invention may be used with a wide variety of animal containment devices. In one embodiment, the device may be a cage wherein the top of the device may be a mesh, a solid top, or a partially open top. A partially open top may be used when the device is used in a rack system wherein the animal cannot escape the device when the device is placed in the rack as a portion of the rack blocks the open portion. Alternatively, the open portion, or any other design of the top, may be fitted with means for filtering air and/or means for dispensing food and water. These means may be hung from a mesh top or may be used to block off the open portion of the top. Alternatively, these filters and/or means of dispensing food and water may be used in place of all or a portion of one of the walls of the device, such as the front wall. In those embodiments using a filter, the cage of the present invention may also be useful in helping to prevent the spread of disease. The use of the cage in a ventilated rack provides a positive pressure within the cage, thereby helping to reduce the spread of pathogens.

In other embodiments, the framework of the device may be designed to include an interface device that permits the device to mate with a ventilated cage rack, thereby providing ventilation air and exhaust directly to the device from the rack ventilation system. The ventilation system may be equipped with a motorized damper to control the flow of air to the device if necessary in response to the output of a device that monitors the air flow and/or carbon dioxide levels in the device of the present invention. In this embodiment, the motorized damper may replace the air diffuser as described previously. The interface device may include a wall and built-in module that are slid into the animal containment device and operate as the rear wall.

In alternative embodiments, the cage/device of the present invention may include means for identifying the cage. This would facilitate identification of the cage while in the rack and may also be used to communicate with the cage using an existing technology, such as Palm technology. In another embodiment, the means for identifying the cage may include a radio frequency identification (RFID) tag that is attached to the cage. The tag may be programmed with identification information, such as the number of the cage, type of animal, number of animals, type of testing, and a combination thereof. The tag could then be read using a reader to keep track of and identify each cage. In one embodiment, the cage identification may be integrated with the monitoring linkage.

In addition, the framework of the device may be designed to permit any electrical or data connections necessary between any monitoring module and the cage rack wiring system. Any connections for ventilation and exhaust and for data and power may be quick-connect types that permit easy installation and removal of individual cages from the cage rack.

In other embodiments, the animal or animals in the cage are provided with means for identifying the animal or animals therein, either in addition to the means for identifying the cage, or in lieu thereof. The animals may be fitted with a collar or other device having means for identifying the animal, or the means for identifying the animal may be implanted into the animal. As such, an animal may be removed from a cage for cleaning and placed in another cage and reinserted into a ventilated rack. As with the means for identifying a cage, the means for identifying the animal may be programmed with identification information, such as the type of animal, type of testing, and a combination thereof. The means for identifying the animal may be selected from an RFID tag or any other suitable means that may be attached or implanted on an animal.

Reference is now made with specific detail to the drawings in which like reference numerals designate like or equivalent elements throughout the several views, and initially to FIGS. 1-6.

Figure 1:
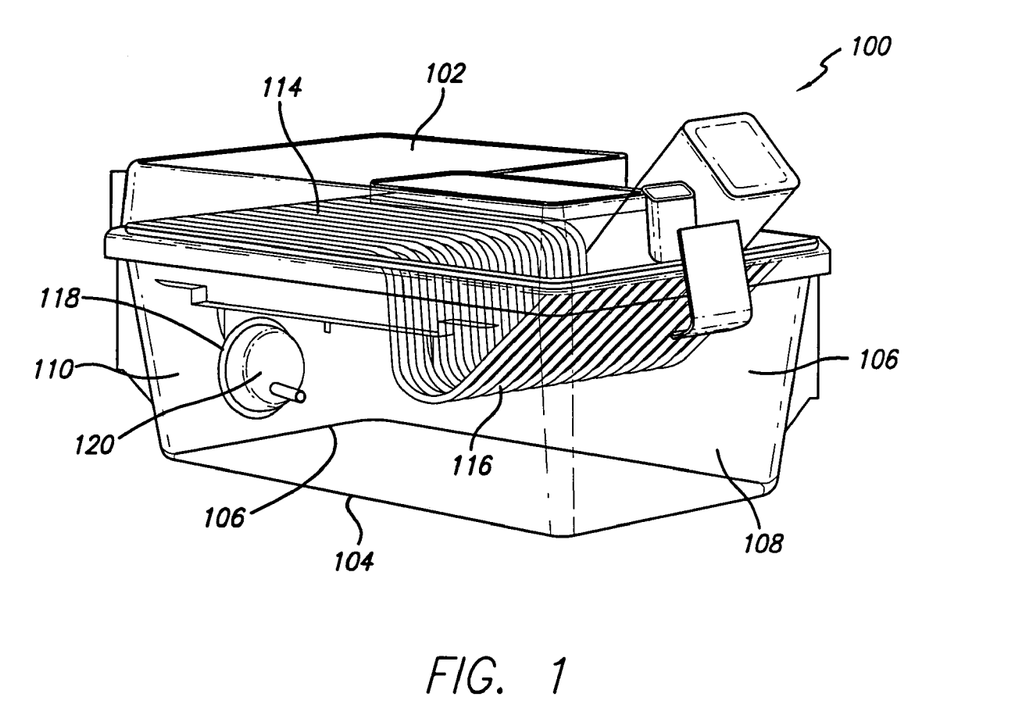
FIG. 1 is a perspective view of one embodiment of an animal control device in accordance with one aspect of the present invention.

FIG. 1 is a perspective view of one embodiment of an animal control cage 100 in accordance with one aspect of the present invention. The cage 100 includes a top wall 102, a bottom wall 104, two side walls 106, a front wall 108 and a rear wall 110. The walls may be made from a translucent material, such as polycarbonate. As shown in FIG. 1, the walls are solid except for the top wall 102 and rear wall 110. The top wall 102 includes an opening 112 for a filter top 114. The top wall 102 also includes a wire rack 116 for dispensing food and water, such as from a water bottle 125. The rear wall 110 includes an opening 118 that permits insertion of a monitoring module 120.

Figure 2:
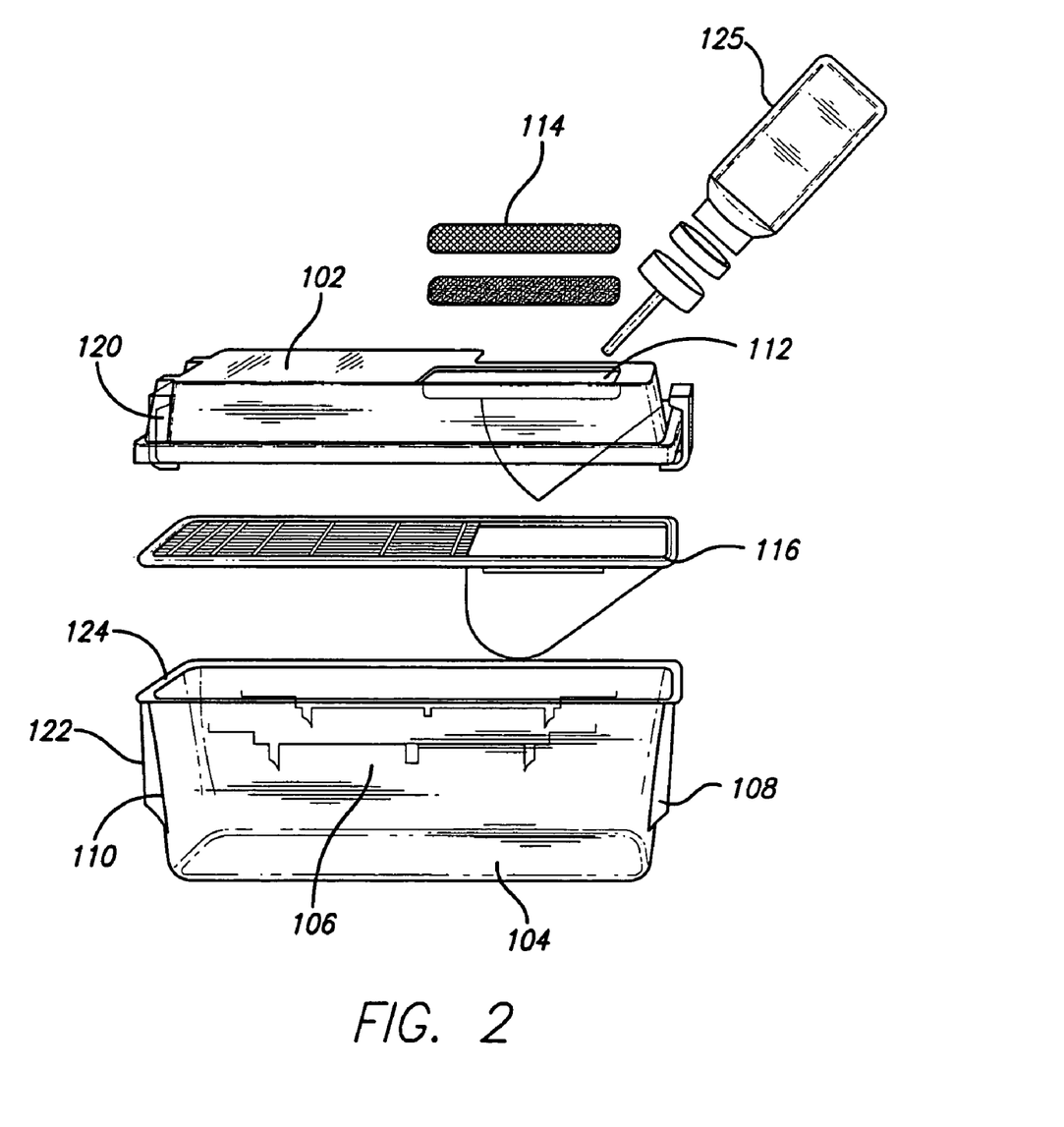
FIG. 2 is an exploded view of one embodiment of an animal control device in accordance with one aspect of the present invention.

FIG. 2 is an exploded view of the animal control cage 100 and shows the opening 112 and filter top 114 as well as the monitoring module 120 that is placed in guides 122 such that it substantially blocks the opening 124 in the rear wall 110 and helps become the rear wall 110 of the cage 100.

Figure 3:
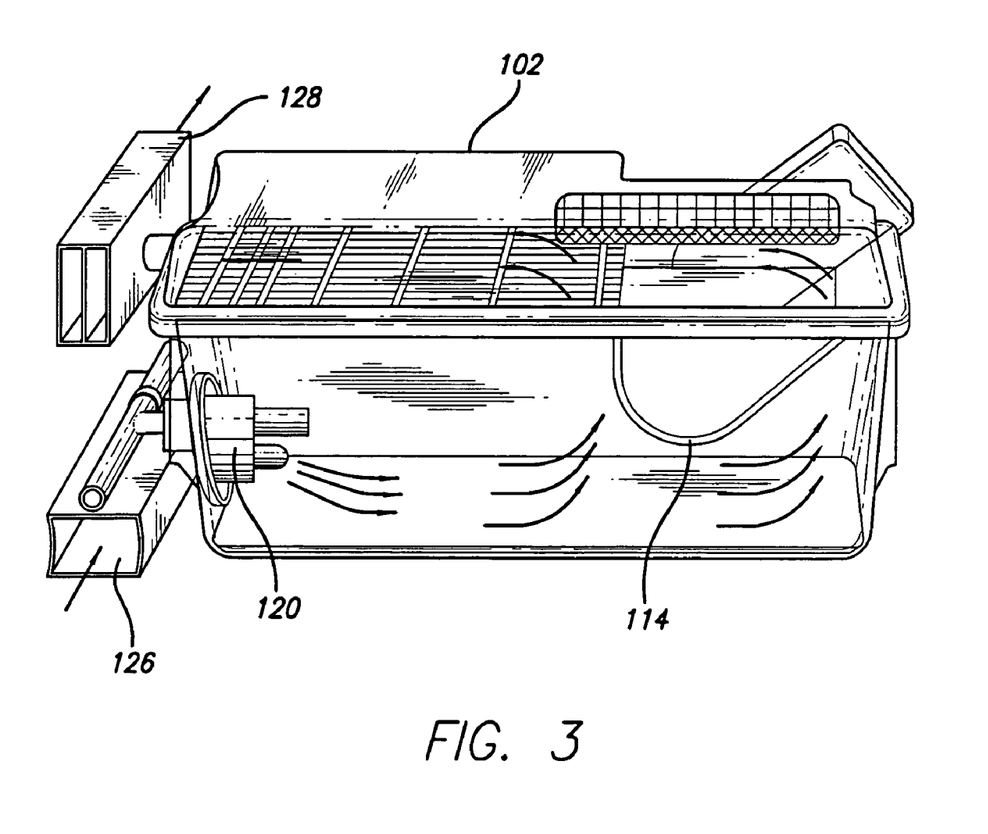
FIG. 3 is a side view of one embodiment of an animal control device in accordance with one aspect of the present invention.

FIG. 3 is a side view of the animal control cage 100 and shows the flow of air through the cage using an air supply 126 and exhaust 128 that are connected to the rear 106 of the device.

Figure 4:
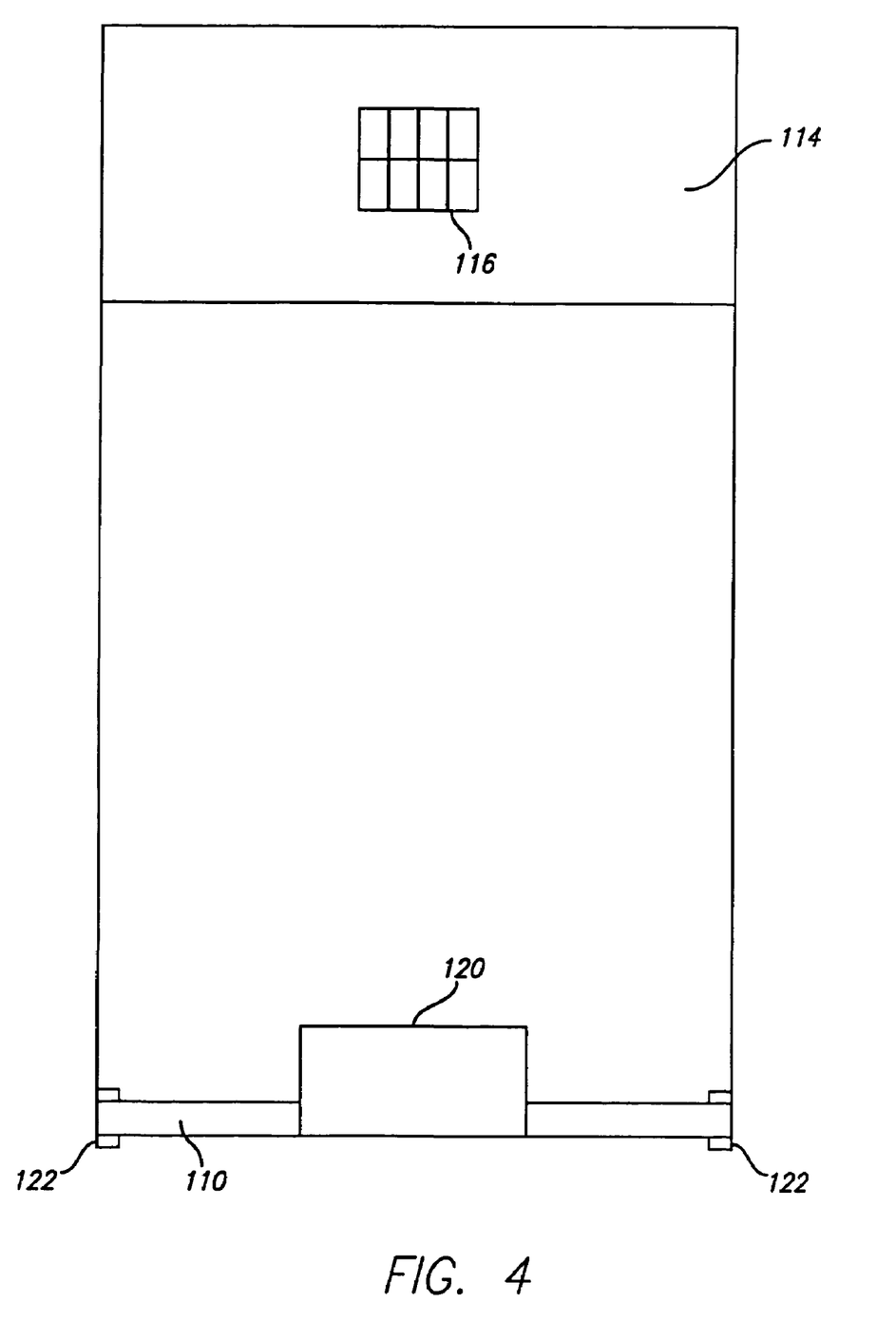
FIG. 4 is a top view of one embodiment of an animal control device in accordance with another aspect of the present invention.

FIG. 4 is a top view of an animal containment device and better shows one embodiment of how the monitoring module 120 is integrated with the rear wall 110 of the device such that it may be easily slid into guides 122 such that the rear wall 110 and monitoring module 120 become the rear wall 110 of the cage 100.

FIGS. 5a and 5b are cross-sectional views of different embodiments of a monitoring module 120 used in conjunction with a ventilation system to show how a monitoring module may be used in conjunction with a ventilation system, as well as a damper for controlling air flow into the cage. In these embodiments, the rear wall 110 of the cage 100 includes a monitoring module 120. The module 120 has an air supply inlet 126 and an exhaust 128 integrated with the module. The module 120 also includes one or more sensors 130 to monitor various conditions. The module 120, in this embodiment, may be designed to snap into an opening 124 in the back of the cage.

In addition to the air supply 126, exhaust 128 and sensors 130, the module 120 may also include a damper 132 for controlling air flow into the cage 100 and to help prevent a stream of air from blowing directly onto the animals. The damper 132 may be motorized and controlled using the monitoring module such that air flow into and from the cage 100 may be controlled based upon sensor readings from the monitoring module 120. In FIG. 5a, the module 120 is shown to include a fire wire 134 or similar connecting port for connecting a fiber optic or hardwire connection 136 to the cage 100. In FIG. 5b, the module 120 includes a venturi section.

In FIG. 6, a cage 100 is shown having a module 120 with an air supply inlet 126 and exhaust 128. In addition, the module 134 includes a fire wire port 134 and a channel 140 in which a monitoring linkage 136, such as a fiber optic or hard wire connection, may be placed. On the front of the cage 102, a display 142 is provided for displaying information from the monitoring module that is transferred to the display 142 using the monitoring linkage 136. In addition, an RFID tag 144 is also located on a front of the cage 100 for providing identification information regarding the cage and/or the animals contained therein.

Although the illustrative embodiments of the present disclosure have been described herein with reference to the accompanying drawings and examples, it is to be understood that the disclosure is not limited to those precise embodiments, and various other changes and modifications may be affected therein by one skilled in the art without departing from the scope of spirit of the disclosure. All such changes and modifications are intended to be included within the scope of the disclosure as defined by the appended claims.

What is claimed is:

1. An animal containment device comprising:
a top wall;
a bottom wall;
a front wall;
at least one side wall;
a rear wall having an opening constructed and arranged to insert a monitoring module;
and a monitoring module located in the opening, wherein the rear wall further includes guides for holding the monitoring module such that the monitoring module substantially covers the opening in the rear wall.

2. The animal containment device of claim 1, wherein the top wall, bottom wall, front wall, rear wall, and at least one side wall are composed of a translucent material.

3. The animal containment device of claim 2, wherein the translucent material comprises polycarbonate.

4. The animal containment device of claim 2, wherein the top wall, bottom wall, front wall, rear wall, and at least one side wall include a photosensitive material.

5. The animal containment device of claim 4, wherein the photosensitive material is selected from silver chloride, silver halide, a polyamide, or a combination thereof.

6. The animal containment device of claim 1, wherein the animal containment device is constructed and arranged to mate with a ventilated cage rack system.

7. The animal containment device of claim 1, wherein the animal containment device further includes a monitoring linkage for displaying data from the monitoring module to a display.

8. The animal containment device of claim 7, wherein the monitoring linkage is selected from a fiber optic connection or a wireless fidelity connection.

9. The animal containment device of claim 7, wherein the display is selected from a liquid crystal display, a light emitting diode display, or an infrared display.

* * * * *